United States Patent [19]
Webb

[11] 3,974,700
[45] Aug. 17, 1976

[54] TECHNIQUE AND APPARATUS FOR BALANCING ROTATING MEMBERS

[76] Inventor: Gene H. Webb, 848 Baird St., Akron, Ohio 44306

[22] Filed: Sept. 5, 1974

[21] Appl. No.: 503,257

[52] U.S. Cl. ............................. 73/468; 74/573 R; 416/144
[51] Int. Cl.² .................... G01M 1/32; F04D 29/66
[58] Field of Search .............. 73/66, 455, 468, 470; 416/144, 145; 74/573

[56] References Cited
UNITED STATES PATENTS

| | | | |
|---|---|---|---|
| 861,463 | 7/1907 | Hyde | 74/573 |
| 1,554,014 | 9/1925 | MacFarland | 74/573 |
| 1,603,076 | 10/1926 | Hanson | 73/455 |
| 2,085,769 | 7/1937 | Scott | 416/145 |
| 2,722,830 | 11/1955 | Federn et al. | 73/463 |
| 2,963,914 | 12/1960 | Dupovy | 73/468 X |
| 3,508,843 | 4/1970 | Schmidt | 416/144 |
| 3,782,202 | 1/1974 | Anderson et al. | 73/455 |

Primary Examiner—James J. Gill
Attorney, Agent, or Firm—Oldham & Oldham Co.

[57] ABSTRACT

Disclosed is a technique and apparatus for dynamically balancing rotating members without the necessity of dismantling the same. A horizontally mounted fan is disclosed having passageways in the shaft thereof leading to receptacles within the fan blades themselves wherein weights may be deposited by means of the centrifugal force of the rotating fan. Further means are presented wherein access may be made to weight receptacles of a sealed fan system by means of a weight depositing probe which is operative to make engagement with the various weight receptacles. Yet another embodiment utilizes tubular passageways mounted externally to the rotational shaft of a horizontal system to make engagement with weight receptacles positioned about the rotating system. Also disclosed is a unique slide rule particularly adapted to appropriately divide a requisite balancing weight into components for the various weight receiving receptacles available.

11 Claims, 20 Drawing Figures

TECHNIQUE AND APPARATUS FOR BALANCING ROTATING MEMBERS

BACKGROUND OF THE INVENTION

Heretofore in those arts wherein rotating devices are utilized, it has been recognized that any unbalance of the rotating member about its rotational axis results in inefficient operation thereof and excess wear to the member at its rotational point. The excess wear causes further unbalance and hence the condition of unbalance has a tendency to aggravate itself. Consequently, many approaches have been devised for purposes of dynamically balancing such members. Often times attempts are made to balance the rotational elements prior to the assembly of the system in which they are to be utilized since, once constructed, the rotating member is not easily accessible. If such balancing techniques are not satisfactory then much dismantling work is generally required to make access to the fan or rotating member for purposes of applying counterbalancing weights.

Further, it has been known on many rotating elements, such as fan blades, that only certain points are available about the circumference of the rotating member on which the balancing weights may be placed; i.e. the fan blades themselves. Consequently, certain amounts of vector analysis and trigonometric solution must often be utilized in order to divide the appropriate counterbalancing weight among the various elements available so as to achieve the balancing objectives.

Because of the complexity of the analysis and techniques heretofore utilized in the balancing of large complex rotating turbines, fans, and the like, it is most desirable to provide new and useful techniques and apparatus for balancing rotating members wherein the complex techniques for ascertaining the requisite placement of counterbalancing weight is simplified and wherein accessibility to the points whereat counterbalancing weights must be placed is more easily achieved.

Consequently, it is an object of the instant invention to present a technique and apparatus for balancing rotating members wherein a simple mathematical formula may be implemented for determining the magnitude and positioning of the requisite counterbalancing weights.

Yet another object of the invention is to present a technique and apparatus for balancing rotating members wherein charts, graphs, or a special purpose slide rule may be utilized for readily ascertaining the magnitude and positional relationship of the requisite counterbalancing weights.

Still another object of the invention is to present a technique and apparatus for balancing rotating members wherein counterbalancing weights may be easily affixed to the rotating member without the necessity of extensive down time or dismantling of the device and wherein the rotating member itself is characterized by the presence of a counterbalancing weight receptacle.

Another object of the invention is to present a technique and apparatus for balancing rotating members which is easily utilized, inexpensive to implement, highly reliable, and conducive to incorporation with presently existing systems and techniques.

These objects and other objects which will become apparent as the detailed description proceeds are achieved by the adaptation of rotating members to have spaced thereon weight receiving compartments readily accessible for receiving weights while the rotating system is intact and the implementation of mathematically derived curves, charts, and a special purpose slide rule to determine the quantity and positioning of the requisite counterbalancing weights.

For an appreciation of the techniques and apparatus of the invention reference should be had to the following detailed description and accompanying drawings wherein:

FIG. 3, comprising

FIG. 4, comprising

FIG. 5, comprising

FIG. 6, comprising FIG. 7, comprising

Figures 1, 2:
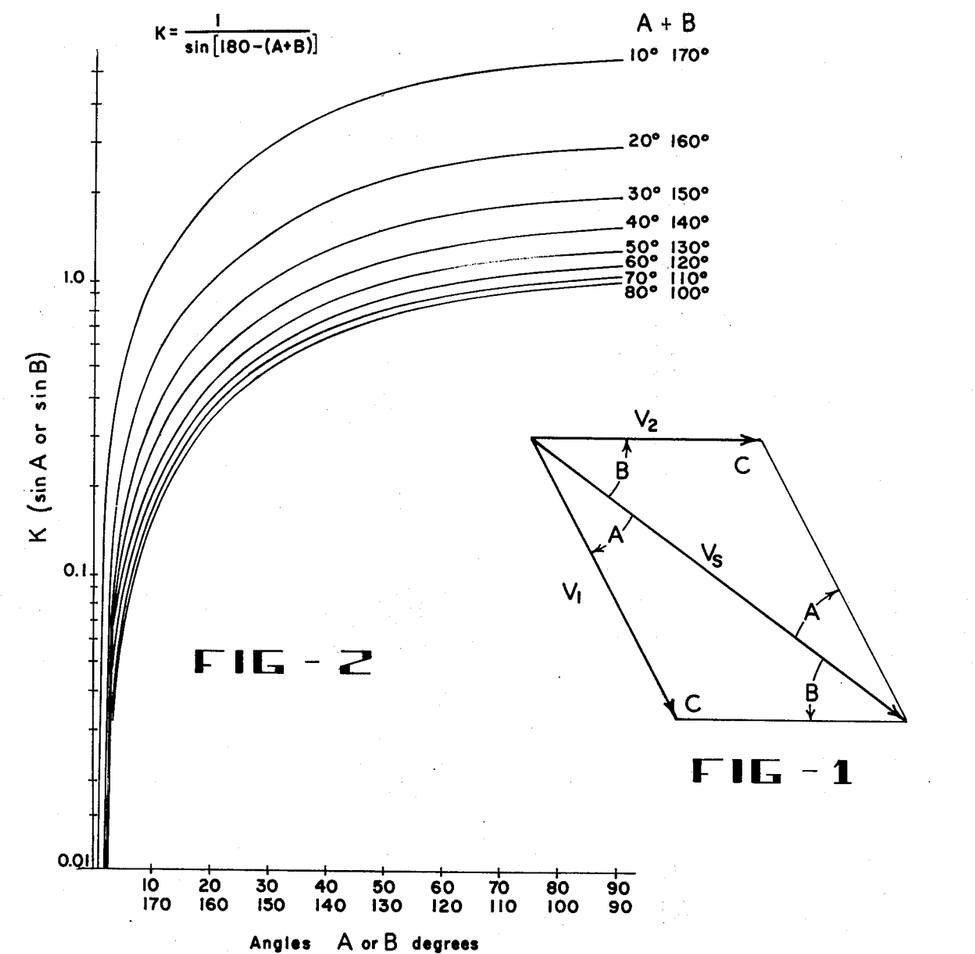
FIG. 1 is a vector diagram showing the analytical development and application of the technique of the invention.
FIG. 2 is a graphical illustration of the relationships between vector components and the requisite counterbalancing force.

Referring now to the drawings and more particularly FIG. 1, an understanding of the development of the technique of the invention may be had. It will be assumed for purposes of description that the requisite counterbalancing vector necessary for balancing the rotating member has been ascertained by utilizing any of numerous structures and techniques presently available in the art. As is well known, many of these techniques employ strain gauges and the like positioned about the rotational axis of the member for determining the magnitude and direction of force variations about the axis. The particular type of devices utilized for ascertaining the necessary counterbalancing vector is not critical for purposes of an understanding of the invention described herein. Suffice it to say that a counterbalancing vector has been determined.

As is well known in the art and as is shown in FIG. 1, a final balance vector $V_s$ may be divided into two component vectors $V_1$ and $V_2$. Of course, these component vectors $V_1$ and $V_2$ are angled with respect to the composite vector $V_s$ with the vector $V_1$ making a clockwise angle A and the vector $V_2$ a counterclockwise angle B with respect thereto. By using the law of sines, it is known that $[V_1/\sin B = V_s/\sin C$ or $V_1 \sin C = V_s \sin B]$. Since $\sin C = \sin[180° - (A+B)]$, it follows that $V_1 = V_s \sin B/\sin[180°-(A+B)]$. In other words, $V_1 = V_s \sin B/\sin[180°-(A+B)]$ and similarly, $V_2 = V_s \sin A/\sin[180° - (A+B)]$. If $K = 1/\sin[180°-(A+B)]$ then it follows that $V_1 = K V_s \sin B$ and $V_2 = K V_s \sin A$.

It should be readily apparent that, for the balancing of a fan blade, A and B would be portions of respective fan blade elements and the final counterbalancing weight $V_s$ would be divided between the two fan blade elements in accordance with the magnitudes of $V_1 V_2$. There are of course certain limitations placed upon the formulas developed above for their application to the balancing technique of the invention. If the final balance vector $V_s$ has been determined then two weights may be utilized for purposes of balancing the rotor. One of the weights, $V_1$, is placed in a position clockwise from the final balance vector and the other, $V_2$, is placed in a counterclockwise position so long as neither of the angles, A or B, are greater than or equal to 180° and so long as (A + B) is less than 180°. It should be readily apparent that if these conditions are not met then the counterbalancing weights $V_1$ and $V_2$ would be negating the effects of each other.

Once the position of the weight has been chosen by the one performing the balancing technique, the value of K for each angle can be determined. Of course, the positioning of the weights will be determined by the available balancing positions, fan blades or the like available. Once the value of K has been determined then the value of the correction weights necessary may be readily achieved by utilization of the formulas presented hereinabove.

The curves of FIG. 2, presented on a three cycle log scale, may be readily utilized for determining the amount by which the counterbalancing weight need be multiplied to determine the two components thereof discussed hereinabove. As can be seen, there is presented in FIG. 2 a family of curves given in increments of 10° for the angles (A+B). The abscissa of the graph gives the corresponding values of K times the sine of A or the sine of B depending upon which is being utilized. In other words, the ordinate value of any point on the graph is equivalent to K sin (abscissa). With this abbreviated understanding and presentation of the graph of FIG. 2, a clearer presentation may be had by reference to the following steps which may be utilized in conjunction with the curves of FIG. 2 to achieve the balancing technique.

Step 1. By utilizing any of numerous balancing tests known in the art, a determination of the counterbalancing weight and position about the axis of rotation should be determined.

Step 2. Utilizing the position ascertained in Step 1, as a reference, a position should be determined clockwise from the reference and at an angle less than 180° therefrom where a weight can be placed. This angle should be labeled A and would, in the balancing of a fan or the like, be a fan blade.

Step 3. A similar position should be found at a counterclockwise angle from the reference position and less than 180° therefrom at which a second weight may be placed. This angle should be labeled B.

Step 4. The total of the two angles of steps 2 and 3 should be less than 180°; that is, (A + B) less than 180°.

Step 5. Out of the family of curves of FIG. 2 that curve should be selected which corresponds to (A + B). Of course, the angle (A + B) is equivalent to the angle of separation at which the balancing weights will be placed with respect to the axis as a vertex.

Step 6. Locate the angle A along the abscissa and find the corresponding ordinate value off of the curve selected. This ordinate value is equivalent to K sin B.

Step 7. Perform the same operation as in Step 6 for B; the ordinate value being K sin A.

Step 8. Multiply K sin A times the counterbalancing weight as found in Step 1 and place this amount of weight at B as selected in Step 3.

Step 9. Multiply K sin B times the weight determined in Step 1 and place this weight at the position selected in Step 2.

Step 10. The rotating element will then be balanced and the effect should be the same as if the single weight were utilized at the reference point as determined in Step 1.

It should of course be readily appreciated that the curves of FIG. 2 cover the full range of angles from 0 to 180°. The supplementary angles allow the curve to be somewhat compact and a single curve is utilized for each of two supplemental values. The family of curves of FIG. 2 are in increments of 10° but of course any number of degrees or steps could be utilized. A large rotor such as a turbine or a large utility boiler fan could readily make use of curves with intervals as small as one degree; but, 90 percent of the presently existing rotating elements contemplated for use with this invention could use curves of five degree or greater intervals.

Figure 3A:
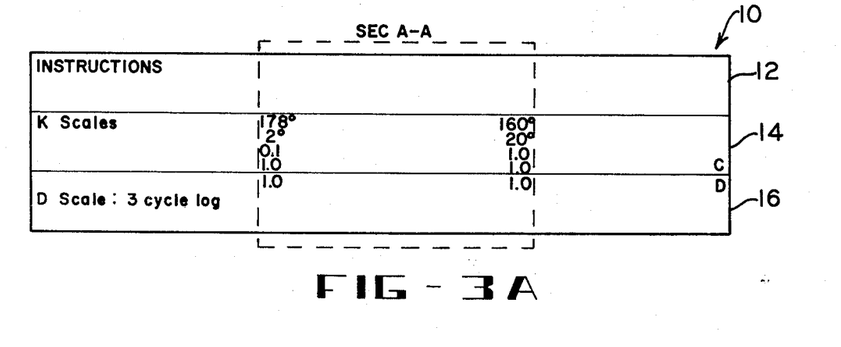
FIGS. 3A–3D, presents a vector slide rule incorporating the relationships of the graph of FIG. 2.
Figure 3B:
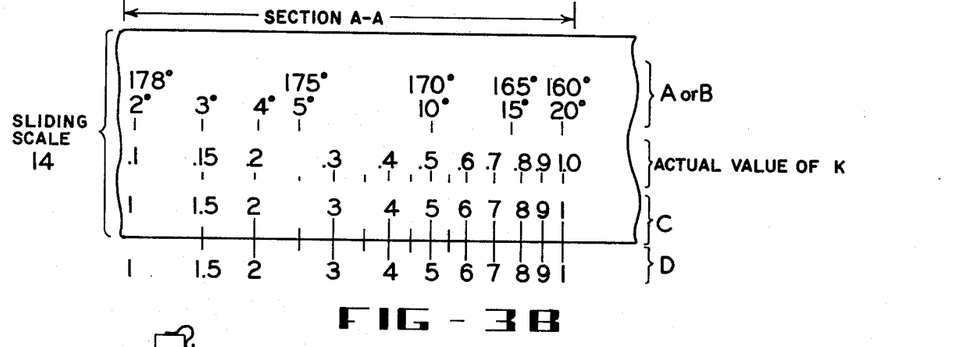

FIG. 3 illustrates a portion of the invention readily utilized in replacement of the curves of FIG. 2 for purposes of determining the component balancing weights. As can be seen, the element of FIG. 3 is a vector slide rule upon which the curves of FIG. 2 have been transposed. The slide rule 10 comprises a top section 12 whereon there may be permanently listed the requisite instructions for utilizing the slide rule. The slider 14, as best shown in FIG. 3B is adaptable for receiving thereon any of numerous sheets corresponding to the sum (A + B) which, of course, is equivalent to the angle at which the balancing weights are to be set apart. The slider 14 contains the angle designations for A and B, the values of K times the sum of the associated angle, and a 3 cycle C scale. The section 16 of the slide rule contains a 3 cycle D scale. A cursor 18 is slidingly received within the section 16 by means of the dovetail engagement at 20. A hairline 22 is interposed in the normal manner on the cursor window as is standard with most slide rules. The cursor 18 is hinged at 24 so that it may be pivoted away from the slider 14 when new plastic sheets or the like are to be affixed thereto. A clip 26 is operative to hold the cursor 18 in a proper upright manner when in normal use.

With an understanding of the structure of the vector slide rule of FIG. 3, an example of the utilization of the same will now be given. When the final counterbalancing weight necessary has been determined in the normal manner and the positions for the component weights with respect thereto have also been determined, the proper sheet containing the angle A + B thereon may be selected and adhered to the slide 14 of the slide rule. The slide is aligned so that the C and D indices are opposite each other. The cursor hairline 22 is thence set on the angle A and the right or left index of the slide is then slid into alignment with the hairline. The final balancing weight found during the balancing sequence is then set on the C scale. The hairline 22 is aligned with this weight value on the C scale and the component weight is then read directly therebelow on the D scale. This amount of weight must then be placed at the angle B. The same procedure is then followed for the angle B so that the two component weights may be ascertained. As can be seen, the slide rule presented in FIG. 3 is a mere reduction of the graphs of FIG. 2 to a slide rule form and further includes a three cycle log C and D slide rule scale.

Figures 3C, 3D, 4A, 4B:
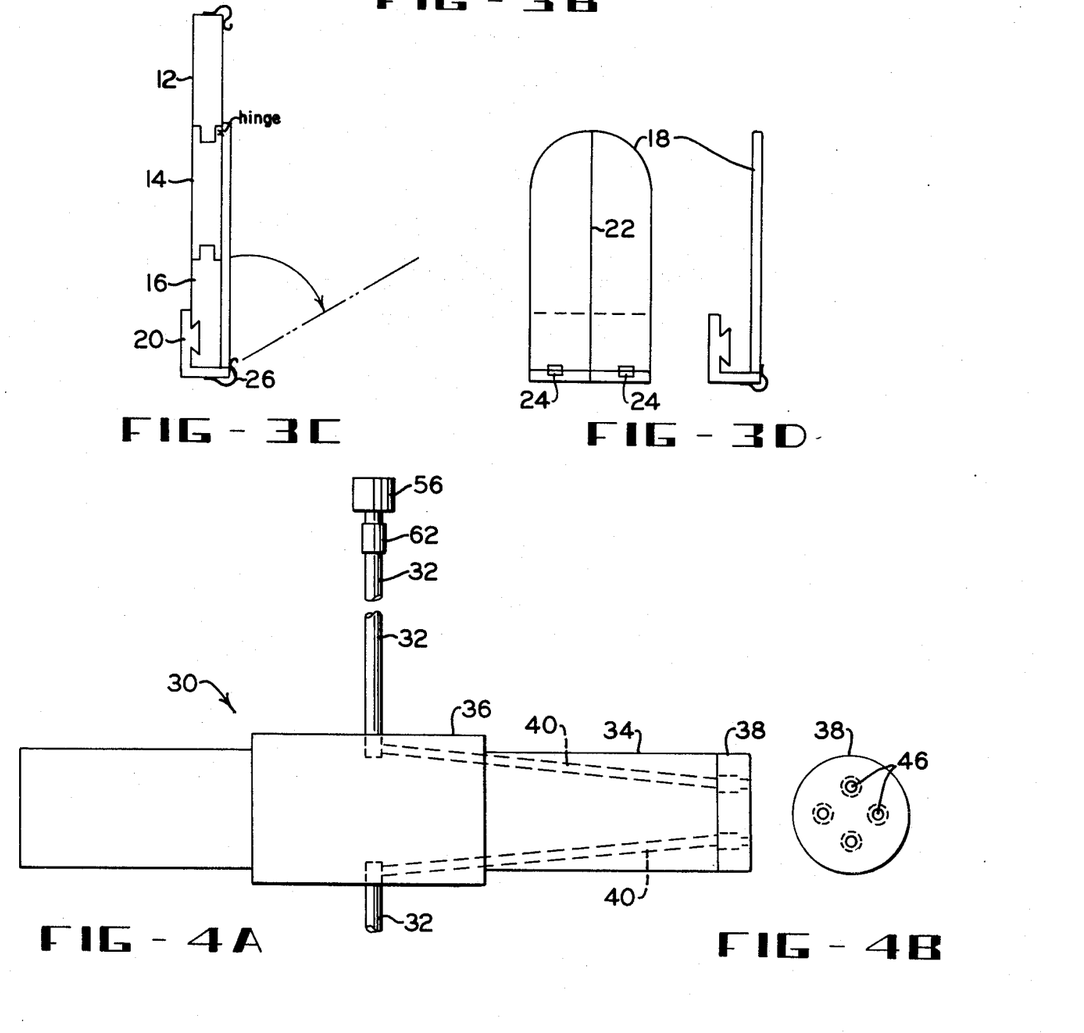
FIGS. 4A–4D, presents an illustrative embodiment of a fan adaptable for utilizing the balancing technique of the invention.
Figure 4C:
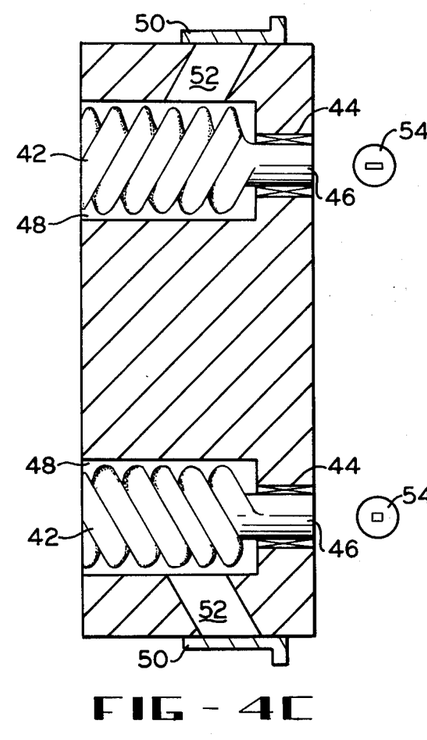
Figure 4D:
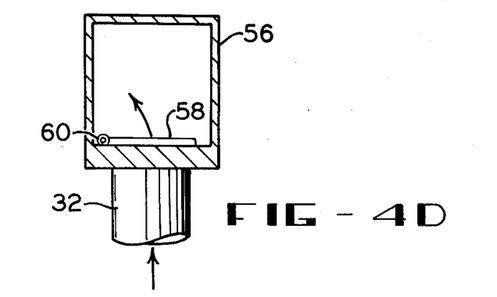

The teachings of the invention require that certain alterations and adaptations be made to presently existing structures so as to most efficiently utilize the techniques thereof. One such alteration is shown in FIG. 4 wherein a horizontal fan type assembly is shown in FIG. 4A and designated generally by the numeral 30. While the fan blades themselves are not shown in this diagram, it should be understood that blade members would extend along and encompass the horizontal tubular elements 32. The fan blades would protrude from the horizontally extending shaft 34 and collar 36. Of course, the shaft 34 would be appropriately secured in a rotational manner to an appropriate bearing arrangement and drive mechanism. A cap 38, best shown in FIGS. 4B and 4C is present and easily accessible at an end portion of the shaft 34. Extending from the cap 38 and angled into engagement with the tubular elements 32 are passages 40. Associated with each of the passages 40 and contained within the cap 38 are spiral drive members 42. The spiral drive members 42 are rotational about needle bearings 44 enclosing a shaft 46 thereof. Each of the spiral drive mechanisms 42 is received within a separate recess 48 within which it may freely rotate. A passage 52 is associated with each of the recesses 48 and makes the recesses 48 accessible by the user by removing an annular seal 50 placed thereover.

According to the technique of the invention, once the component counterbalancing weights and positions therefore have been determined utilizing the procedure presented hereinabove, the annular seal 50 is removed and a spherically shaped material, normally lead shot is placed into the passages 52 associated with the spiral drive mechanisms 42 which feeds the passages 40 connected to the appropriate tubular elements 32. With the shot placed in the passage 52, an electric scewdriver or the like is engaged with the head 54 (two embodiments being shown) and excitation of the element 42 is initiated. With the element 42 spinning, the lead shot is engaged within the grooves characterizing the circumference of the member 42 and is spun upward to rest at the base of the inclined passage 40. When the fan member 30 begins to rotate about the shaft 34 the lead shot is forced upward through the inclined passage 40 and out through the tubular member 32 associated therewith by centrifugal force. At the end of each of the tubular members 32 is a weight receptacle 56 the access to the interior of which is achieved through the one way valve 58 pivotal about the pin 60. It should be readily apparent that the lead shot moving down the tubular member 32 will force the one way valve 58 open and make access to the interior of the receptacle 58 within the end of the fan member. The receptacle 56 is threadably engaged with a sleeve 62 to facilitate easy removal of the lead shot if such removal ever becomes necessary.

Thus it can be seen from the structure of FIG. 4 that a fan system may be readily balanced without requiring any dismantling of the system or welding of weights or the like thereto. If access can be made to either of the ends of the shafts 34 then the appropriate cap 38 and passages 40 may be placed within the shaft to make access to the end of the fan blade. This technique has proved to be quite satisfactory for balancing many turbine type fan systems and other horizontally mounted systems.

Figure 5A:
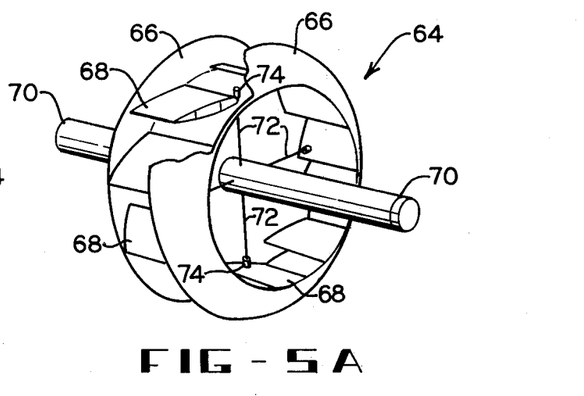
FIGS. 5A–5C, presents the structure and implement necessary to balance a centrifugal fan or the like according to the teachings of the invention.
Figure 5B:
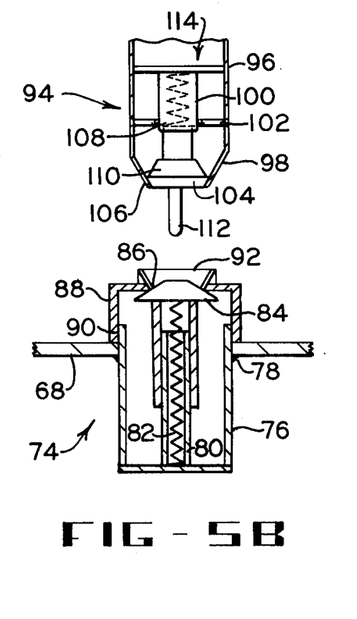

In FIG. 5 still another type of fan is shown which is adaptable for utilizing the structure and technique of the invention. As can be seen, the fan designated generally by the numeral 64, comprises rims 66 between which extend fan vanes 68. The vanes 68 are presented circumferentially about a shaft 70 appropriately secured to certain of the vanes 68 or rims 66 by means of spokes 72. Weight receptacles 74 are provided within certain vanes 68 for purposes of depositing the lead shot weights discussed hereinabove therein in accordance with the aforementioned techniques of the invention. The receptacle 74 and its relationship to the vane 68 is shown in cross sectional view in FIG. 5B as including a basically cylindrical section 76 fixedly secured to the vane 68 as for instance by welding at 78. Received within the container 76 is a tubular shaft 80 having a coil spring 82 protruding therefrom. Slidingly received upon the shaft 80 is a valve 84 biased into sealing engagement with a valve seat 86. The valve 84 is shown as having a conical head but may of course be of any suitable nature. The seat 86 is an annular portion of a cap 88 which is adaptable to be threadingly engaged with the cylindrical section 76 as at 90. Leading into the seat 86 and forming a portion of the cap 88 is a preferably funnel-shaped opening 92. It should be readily apparent that the valve 84 may be disengaged from the seat 86 by the application of pressure against the conical head thereof forcing the biasing spring 82 toward the bottom of the cylindrical section 76. Once so opened, the container 76 may receive the appropriate amount of lead shot to properly balance the system.

Also shown in FIG. 5B is a device 94 operative in association with the receptacle 74 for placing lead shot weight therein. The device 94 fundamentally comprises a tubular member 96 tapered at a bottom end 98 thereof and retaining concentrically therein a second tubular member 100 is affixed to the sides of the tubular member 96 by means of screws 102 or other appropriate means. A plunger 104 is slidingly received within the tubular element 100 and is normally biased into sealing engagement with the tapered end 98 at 106 by virtue of the presence of a biasing spring 108 interposed between the element 100 and the plunger head 110. A probe 112 depends from the bottom of the head 110 and is functional for making engagement with the spring biased valve of receptacle 74. In operation, the probe 112 is forced into engagement with the conical head of the valve 84 thus forcing the valve 84 out of the seating engagement at 86 and making access to the interior of the receptacle 74 while simultaneously forcing the head 110 out of sealing engagement with the tapered end 98 thus allowing an open passage from the interior of the tubular member 96 to the interior of the receptacle 74. Lead shot may then be placed into the open end of the member 96 at 114 and allowed to pass downward through the opening created between the head 110 and the tapered end 98 and into the opened valve 94. When the proper number of lead shot weights have been dropped into the receptacle 74, the device 94 is removed allowing the valve 84 to again seal thus retaining with the receptacle 74 the proper amount of counterbalancing weight. Of course, any of numerous embodiments of the device 94 may be utilized for depositing the weights within the proper receptacle.

Figure 5C:
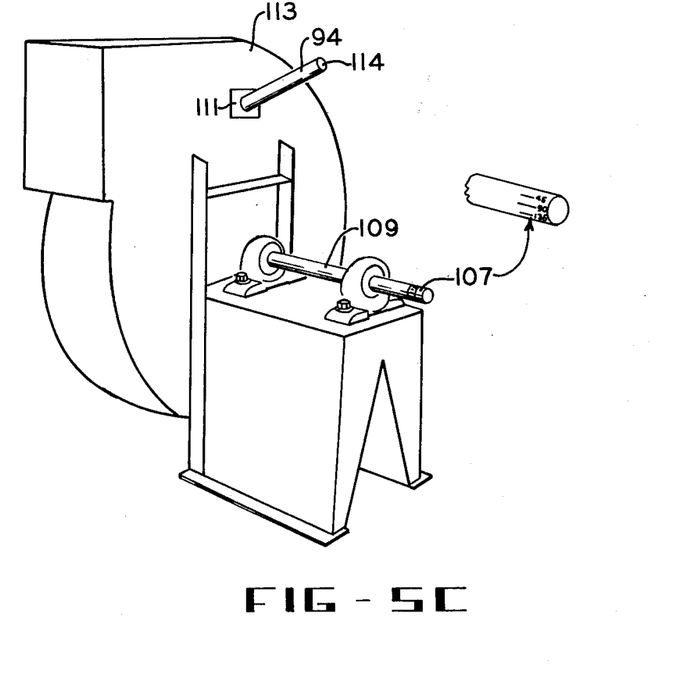

A centrifugal fan is shown in FIG. 5C which employs the structure of FIGS. 5A and 5B. As can be seen, the fan assembly is sealed by a cover 113 having a sealed opening 111 therein to receive the device 94. The bearing shaft 109 upon which the fan is rotatably mounted has an index 107 thereon to indicate the positioning of the various receptacles 74 such that the user may know when the appropriate receptacle 74 is in operative positional relationship with the device 94.

As is well known in the industry, there are many fans and other rotating implements which are contained within a sealed environment and are not readily accessible. Many of the devices are utilized in chemical processes which require sealed devices because of toxic or other harmful fluids, fumes or the like. Such a fan is shown in FIGS. 6A through 6E in an embodiment which utilizes the balancing technique of the invention. This fan, designated generally by the numeral 114 is mounted upon a rotatable horizontal shaft 116 having a plurality of fan blades 118 affixed to one end thereof. The fan blades 118 operate within an environment enclosed by a casing 120. Fixedly secured to the horizontal shaft 116 is a shroud 122 maintained upon the shaft by means of a collar 132. An annular seal is fixedly connected to the casing 120 and is operative for making sealing engagement with the shroud 122. The combination of casing 120, shroud 122, and seals 128 provides a complete closure for the fan system.

Figure 6A:
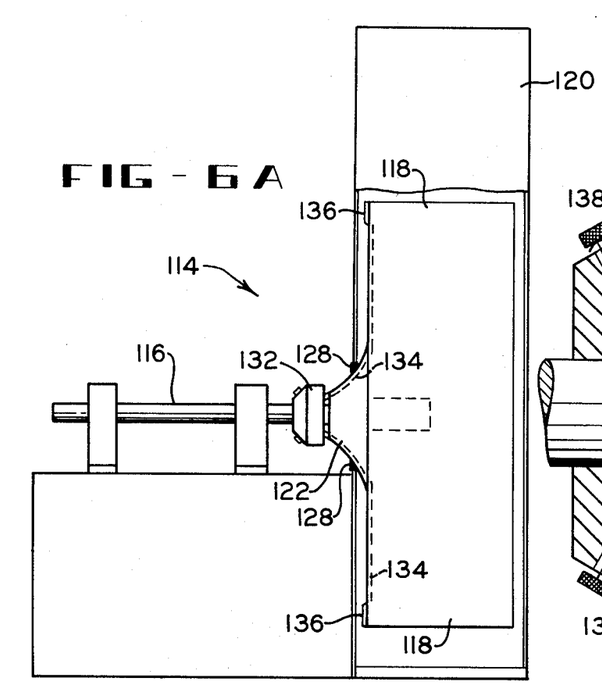
FIGS. 6A–6E, presents a showing of a horizontally mounted fan adaptable for utilizing the techniques of the invention.

Extending under the shroud 122 and being receivably connected to the shaft collar 132 are curvate tubular members 134. As can be seen, the tubular members 134 extend into contacting engagement with the fan blades 118 and have, at the end thereof, receptacles 136 for receiving the aforementioned lead shot weights.

The collar 132 is preferably provided with access means such as the spring-biased bolts 138 passing therethrough for making access to the respective tubes 134. There would of course be one bolt 138 associated with each of the tubes 134. With the proper bolt 138 removed, the appropriate number of lead shot weights corresponding to the component counterbalancing weight required may be deposited into the tube 134 and, when the fan 114 is caused to rotate, centrifugal force will again carry the lead shot out the tube 134 and into the weight receptacle 136. Thus, the fan assembly 114 may be readily balanced with only a minimum of down time for the system and with no access being made directly to the interior of the casing 120 wherein there may be toxic or other dangerous elements encased. It is again, the centrifugal force of the fan itself which forces the weights into the counterbalancing engagement with the fan and which provides for the efficient and yet simplistic operation of the technique in the instant invention.

Figure 6B:
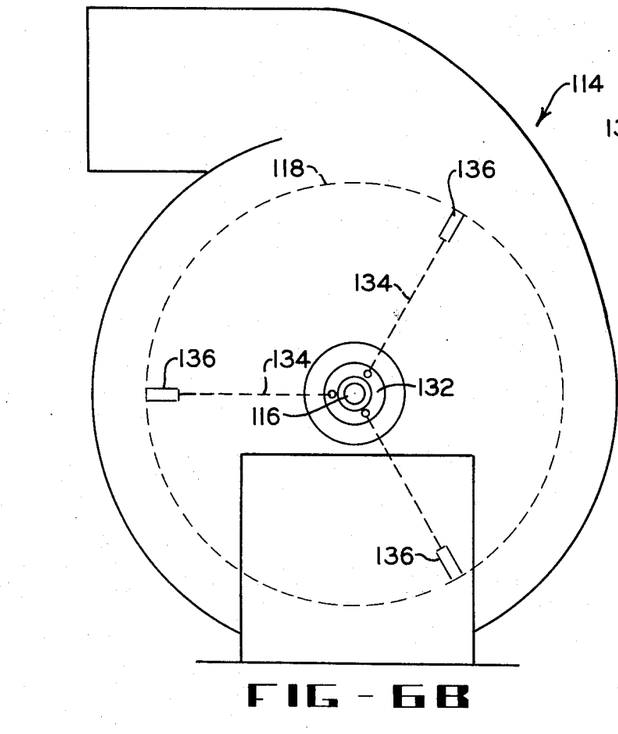
Figure 6C:
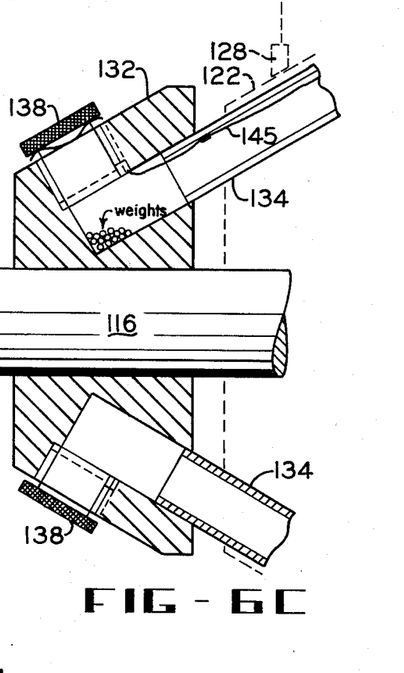
Figure 6D:
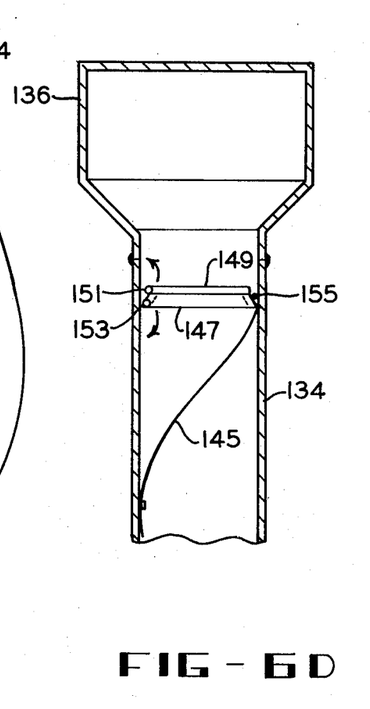
Figure 6E:
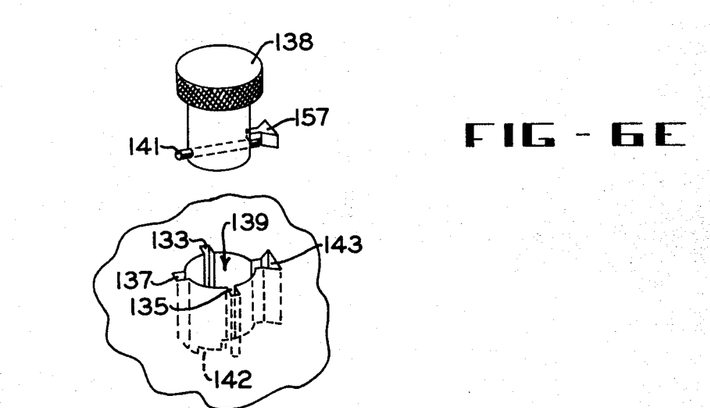

As shown in FIGS. 6C-6E, the balancing system for the fans of FIGS. 6A and 6B may be more sophisticated than just described. A unique provision of this invention is the utilization of the spring-biased bolt 138 for providing access to a receiving structure 139 which is uniquely keyed for the bolt assembly. Passing through a bottom of the bolt assembly 138 and protruding from each side thereof is a rod 141 operative for making sliding engagement with opposed slots 133, 135 and slot 137 and a keyed slot 143. With the bolt 138 removed from the receiving structure 139, as by aligning the rod 141 with slots 133, 135, lead weights may be deposited therein in a quantity sufficient for balancing the fan member. After such weights have been deposited, the bolt 138 is then placed in the receiving structure 139 by sliding the protrusions of the rod 141 down the slots 133, 135. When the rod 141 reaches the bottom of the slots 133, 135, rotation of the bolt 138 causes the rod 141 to slide within a retaining slot 147 at the bottom of the receiving structure 139. At this time the system is sealed for operation. Slidingly received within the keyed slot 143 is a mating key 157 which normally rests at the bottom of the key slot 143 and above the retaining slot 147.

Extending from the key 157 is a wire 145, which may be of any suitable nature but is preferably of a stranded stainless steel construction. The wire 145 passes from the key 157 upward through the curvate tubular member 134 and is fixedly attached at an end thereof to an annular plate 147 which comprises the bottom portion of the valve assembly allowing access to the interior of the receptacle 136. Resting upon the annular plate 147 is a sealing plate 149. The sealing plate 149 is operative about a hinge 151 to swing inward toward the inside of the receptacle 136 when the fan is in operation so as to allow lead shot weights to pass through the annular plate 147 and into the receptacle 136. The annular plate 147 is hingedly secured at 153 to swing down from the receptacle 136 and into the tubular member 134 to allow the lead shot weights retained within the receptacle 136 to be released therefrom. A stop 155 is fixedly secured to an inside circumferential edge of the tubular member 134. The hinge 153 is preferable biased so as to cause normal engagement between the plate 147 and the stop 155.

If removal of the weights from the receptacle 136 is desired, turning of the bolt 138 with the retaining slot 147 to align the rod 141 with the keyed slot 143 and partial removal of the same from the receiving structure 139 will withdraw key 157 and so draw the wire 145 as to pivot the structure 147, 149 about the hinge 153 thus allowing the lead shot weights within the receptacle 136 to pass downward through the associated curvate tubular member 134. Thus removal and replacement of the lead shot weights in the balancing receptacle 136 may be readily achieved without making access to the interior of the housing 120.

It should be readily apparent that the bolt 138 has three operative positions. An open position is achieved by aligning the rod 141 with the slots 133, 135 thus allowing the bolt 138 to be removed for the depositing of weights. A closed position for normal operation is achieved by rotating the bolt 138 clockwise as shown in FIG. 6E so as to retain the rod 141 within the slot 147. A third position provides for the return of the weights whereby the aligning of the rod 141 with the slot 137 and keyed slot 143 allows the partial removal of the key 157 from the slot 143 and the consequent opening of the plates 147, 149 to provide access to the receptacle 136.

It should be readily apparent that the standard structure of the device of FIG. 6 need only be slightly altered to be conducive for application of the technique of the invention. Indeed, for presently existing systems it is only necessary that the seal 128 be altered so as to receive an additional shroud 122 for enclosing the tubular members 134.

Figure 7A:
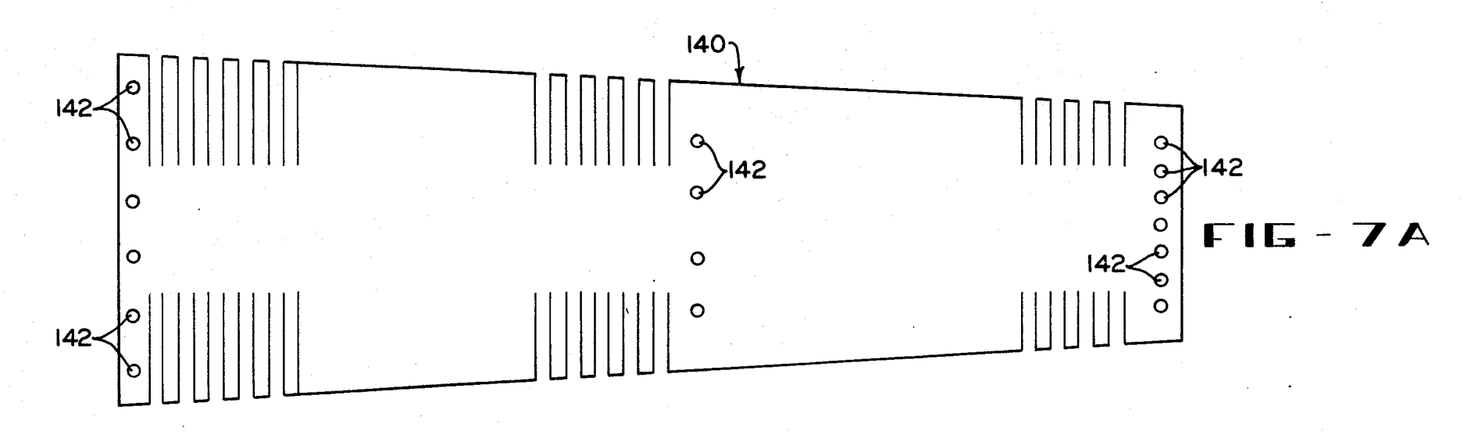
FIGS. 7A and 7B, is a pictorial illustration of a turbine having a plurality of counterbalancing weight receptacles positioned therein which is adapted for utilizing the balancing techniques of the invention.
Figure 7B:
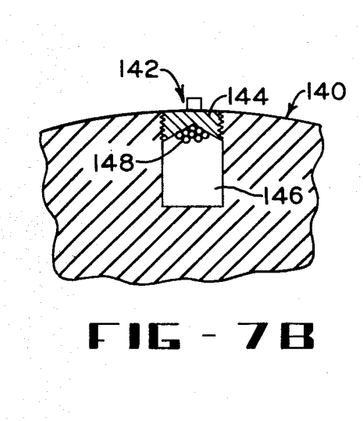

The utilization of the structure of the instant invention for purposes of balancing a turbine is shown in FIG. 7. As can be seen in FIG. 7A, the turbine 140 has a plurality of weight receptacles 142 in close spaced relationship therealong. Since the balancing of turbines is generally more sensitive and critical than the balancing of other rotating members, a larger number of such receptacles are provided closer spaced relation than would normally be utilized. Further, because of the high degree of accuracy required for positioning of the counterbalancing weights, the receptacles 142, as shown in FIG. 7B, are particularly designed so as to quite accurately position the lead shot weight. As can be seen in FIG. 7B, a threaded cap 144 is operative to sealingly close the receptacle 146. The cap 144 has a conical recess therein which allows the lead weights 148 to compact toward the vertex thereof when the turbine is caused to rotate. Consequently, it is readily predictable as to the exact position where the lead weights will be in operation of the turbine and they are not free to be positioned anywhere along the confines of the receptacle 146 but must indeed be forced into receiving engagement with the vertex of the conical shaped cap. Of course, this type of receptacle may be utilized in any of the adaptations of the invention but is preferred in the turbine since the balancing thereof is quite sensitive.

Thus, it can be seen that the objects of the invention have been satisfied by the structure and techniques presented hereinabove. While in accordance with the patent statutes only the best mode and preferred embodiments of the invention have been presented and described in detail, it is to be understood that the invention is not limited thereto or thereby. Consequently, for an appreciation of the scope and breadth of the invention reference should be had to the following claims.

What is claimed is:

1. The method for balancing an element rotatable about an axis, comprising:
    a. determining the counterbalancing weight and position thereof about the axis necessary for achieving the balancing;
    b. selecting a first depository at a clockwise angle A less than 180° from said position whereat a weight may be placed;
    c. selecting a second depository at a counterclockwise angle B less than 180° from said position whereat a weight may be placed;
    d. determining a constant, $$K = \frac{1}{\sin[180° - (A + B)]},$$

e. placing a weight equivalent to K sin B times the value of the counterbalancing weight determined in step a into a first receptacle, said first receptacle being in communication with said first depository;
    f. placing a weight equivalent to K sin A times the value of the counterbalancing weight determined in step a into a second receptacle, said second receptacle being in communication with said second depository; and
    g. rotating the element about the axis and thereby affectuating passage of said weights from said first and second receptacles to said first and second depositories respectively.

2. In a device rotatable about an axis, the improvement for dynamically balancing said device, comprising:
    a plurality of receptacles positioned about said axis adaptable for receiving balancing weights therein;
    access means connected to each of said receptacles for providing access thereto for the receipt of said balancing weights, said access means comprising tubular channels in substantially parallel relation with said axis and extending in a curvate manner from said axis outwardly to said receptacles; and
wherein said device is a horizontally mounted fan rotatable about a horizontal shaft and maintained within a sealed closure and wherein each of said tubular channels extends from a collar mounted on said shaft and through a shroud in sealing engagement with the casing and into weight-passing communication with the associated receptacle.

3. The improvement as recited in claim 2 wherein said axis is horizontal.

4. The improvement as recited in claim 2 wherein each of said receptacles comprises a chamber in weight-receiving communication with the associated, tubular channels said communication being regulated by a valve pivotally connected at the junction of said curvate tube and said chamber.

5. The improvement as recited in claim 4 wherein said valve comprises a bottom annular plate and a top plate pivotally connected thereto and movably resting thereon, said annular plate being spring-biased into engagement with a stop fixedly secured to an inner edge of said curvate tube and limiting the movement of said annular plate into said chamber.

6. The improvement as recited in claim 5 wherein each curvate tube communicates at said collar with a weight receiving depository, access to which is made through a spring-biased bolt assembly, the bolt being removable from the depository to allow the insertion of weights therein in one position and fixedly retained within the depository to maintain weights therein in a second normal position.

7. The improvement as recited in claim 6 wherein each of said annular plates has connected thereto a wire extending through the associated curvate tube and connected to a key at said associated depository, the adjustment of said bolt to a third position and partial removal of the same from the depository being such as to cause the movement of the key and consequent opening of the annular plate to allow access to said chamber.

8. In a device rotatable about an axis, the improvement for dynamically balancing said device, comprising:
    a plurality of receptacles positioned about said axis adaptable for receiving balancing weights therein; and
    access means connected to each of said receptacles for providing access thereto for the receipt of said balancing weights, said access means comprising tubular channels in substantially parallel relation with said axis and extending in a curvate manner from said axis outwardly to said receptacle, each said receptacle comprising a housing having a one-way valve pivotally connected thereto and operative by centrifugal force to enable communication between the receptacle and associated tubular channel.

9. In a device rotatable about an axis, the improvement for dynamically balancing said device, comprising:
    a plurality of receptacles positioned about said axis adaptable for receiving balancing weights therein;
    access means connected to each of said receptacles for providing access thereto for the receipt of said balancing weights, said access means comprising tubular channels in substantially parallel relation with said axis and extending in a curvate manner from said axis outwardly to said receptacle, wherein each tubular channel terminates at a weight depositing station within a collar, said weight depositing station comprising a spiral driven member in communication with the associated tubular channels and in communication with an operator-accessible weight receiving channel.

10. In a fan having vanes thereon and enclosed within a casing and rotatable about an axis, the improvement for balancing said device, comprising:

a plurality of receptacles positioned about the axis upon the vanes and adaptable for receiving balancing weights therein, each of said receptacles comprising an enclosure having a spring biased valve and seat structure allowing access thereto, the valves being normally biased to a closed position; and access means connected to each of said receptacles for providing access thereto for the receipt of said balancing weights, wherein each said access means includes a spring-biased plunger maintained within a tubular housing, said plunger being operative to make engagement with said valve through an opening in said casing to open said valve and achieve open weight-passing communication between the interior of said tubular housing and said receptacle.

11. The improvement as recited in claim 10 wherein said axis comprises a horizontally mounted shaft extending from said casing and having thereon a plurality of markings indicative of the positional relationship between said opening in said casing and the various receptacles.

* * * * *